United States Patent [19] [11] Patent Number: 4,503,383
Agar et al. [45] Date of Patent: Mar. 5, 1985

[54] DEVICE FOR DETECTING AN INTERFACE BETWEEN TWO FLUIDS

[75] Inventors: Joram Agar, George Town, Cayman Islands; Klaus J. Zanker, Houston, Tex.

[73] Assignee: Agar Corporation, N.V., Curacao, Netherlands Antilles

[21] Appl. No.: 337,836

[22] Filed: Jan. 7, 1982

[51] Int. Cl.³ ............................................. G01R 27/26
[52] U.S. Cl. ..................................................... 324/61 P
[58] Field of Search ................ 324/65 P, 61 P, 61 R, 324/65 R, 60 C; 73/304 R, 304 C

[56] References Cited

U.S. PATENT DOCUMENTS

| 2,258,045 | 10/1941 | Christie | 175/183 |
|---|---|---|---|
| 2,417,099 | 3/1947 | Windeler | 201/57 |
| 3,119,266 | 1/1964 | Atkinson | 73/304 |
| 3,141,129 | 7/1964 | Dietert | 324/65 P |
| 3,278,844 | 10/1966 | Bell et al. | 324/65 |
| 3,283,240 | 11/1966 | Spady | 324/30 |
| 3,862,571 | 1/1975 | Vogel | 324/60 C X |
| 3,879,644 | 4/1975 | Maltby | 324/61 P |
| 4,027,534 | 6/1977 | Zimmerman | 324/65 P |
| 4,169,543 | 10/1979 | Hall | |
| 4,222,267 | 9/1980 | Aldrich | |
| 4,226,118 | 10/1980 | Aldrich | |
| 4,266,195 | 5/1981 | Keefner | 324/61 P X |
| 4,288,741 | 9/1981 | Dechene | 324/61 R |
| 4,347,741 | 9/1982 | Geiger | |
| 4,389,900 | 6/1983 | Gutierrez | 73/861.42 |

FOREIGN PATENT DOCUMENTS 666613 2/1952 United Kingdom .

OTHER PUBLICATIONS

INVALCO-8100 Series Level Control-Jan. 1981.
Drexelbrook-LCS Level Control-1981.
Princo Instruments-Bulletin L-9-81-1981.

Primary Examiner—Stanley T. Krawczewicz
Assistant Examiner—Jose M. Solis
Attorney, Agent, or Firm—Webb, Burden, Robinson & Webb

[57] ABSTRACT

A device for detecting an interface between two fluids of differing electrical properties, said device having an electrical circuit comprising transmitting means for transmitting electrical impulses to said fluids, a detector of electrical impulses, and at least one probe which is adapted to extend into said fluids; said probe comprising an electrically conductive probe member and a grounded electrically conductive shield, the probe member being mounted within the shield and being spaced from the latter by an air core, the probe member adjacent its distal end portion, being sealed to the shield by a dielectric seal which prevents the ingress of said fluid into the space between the shield and the probe member.

12 Claims, 14 Drawing Figures

DEVICE FOR DETECTING AN INTERFACE BETWEEN TWO FLUIDS

BACKGROUND OF THE INVENTION

This invention concerns a device for detecting an interface between two fluids of differing electrical properties.

It is often required to detect an interface between two fluids of differing electrical properties e.g. to detect the interface between the fuel and air in a fuel tank so as to determine the amount of fuel left in the tank. Such detection has in the past often been effected, as shown in U.S. Pat. Nos. 2,789,435 and 3,148,314, by employing a capacitative probe at short wave radio frequencies, the probe being inserted into the fuel tank and being connected in an electrical circuit which includes a meter for measuring the capacitance of the probe. As will be appreciated, the capacitance of the probe will alter according to whether the probe is fully immersed in the fuel, is partly immersed therein, or is not immersed in fuel at all. Such devices which rely on the measurement of capacitance, however, are not suitable for detecting an interface between liquids which form an emulsion with each other or where one of the liquids is an emulsion.

In all these known devices, moreover, the meter is affected by the capacitance between the probe and the tank, while the reading produced by the meter is affected not merely by the position of the interface but also by the electrical properties of the fluids forming the interface. In the known devices, moreover, contamination of the probe can make it difficult to determine the position of an interface, while a change in the fluids used or in the container used for such fluids involves re-calibration.

The object of the present invention is to overcome the above-mentioned disadvantages.

BRIEF DESCRIPTION OF THE INVENTION

According to the present invention there is provided a device for detecting an interface between two fluids of differing electrical properties, said device having an electrical circuit comprising transmitting means for transmitting electrical impulses to said fluids, a detector of electrical impulses, and at least one probe which is adapted to extend into said fluids; and probe comprising an electrically conductive probe member and a grounded electrically conductive shield, the probe member being mounted within the shield and being spaced from the latter by an air core, the probe member, adjacent its distal end portion, being sealed to the shield by a dielectric seal which prevents the ingress of said fluids into the space between the shield and the probe member. The use of such an air core reduces the capacitance of the probe by comparison with prior art probes and thus enables the detector to be arranged to respond to the impedance of the fluids, said impedance being primarily resistive rather than capacitative. This enables the device to be used on emulsions.

Preferably the probe is provided with at least one insulator member mounted within the shield to maintain the spacing between the latter and the probe member. There may be a plurality of insulator members which are axially spaced from each other by distances equal to at least ten times the outer diameter of the shield.

The probe member may extend outwardly of the shield. Alternatively, the shield may have an outwardly extending portion which extends outwardly of the probe member and of said seal. In this case, the said outwardly extending portion may be apertured to provide at least one port through which fluid may enter the said outwardly extending portion.

The diameter of the probe member is preferably not more than one quarter of the diameter of the shield. The length of the probe may be at least two feet (60.96 cms) and may, if desired, be at least three feet (91.44 cms).

The probe may, if desired, be mounted within a seal housing which is sealed to a conduit, the distal end of the probe member extending into said conduit; the seal housing having a main valve for controlling fluid flow therethrough, there being sealing means spaced from the main valve for sealing the seal housing to the probe, and a further valve which communicates with the space within the seal housing and which is disposed between the main valve and the sealing means.

The detector is preferably arranged to respond to the impedance of the fluids, the probe member being connected both the transmitting means and to the detector by way of a capacitor.

There may be means connected to the shield and to the probe member for imparting ultra-sonic vibrations thereto for cleaning purposes. Moreover, there may be means for transmitting a high voltage to the probe member to burn off dirt thereon, and means for preventing operation of the detector during the transmission of said high voltage.

There may be two probes which are arranged to extend into a container for said fluids to different extents, the detector being arranged to respond to the difference between the electrical outputs of the probes.

There may be a container for said fluids and at least one probe which extends into the container and which is connected to a respective detector, the detector operating a respective means for withdrawing or permitting withdrawal of a fluid from said container. In this case, there are preferably upper and lower probes which extend to different levels in the container, the means permitting withdrawal of a fluid from the container comprising valves which control fluid flow from the container, the valve associated with the upper probe having, when open, a faster flow rate therethrough than the valve associated with the lower probes, and means for operating the device so that, when the distal ends of both probe members are below the interface, both valves are open, when the interface is disposed between the said distal ends the faster flow rate valve is closed and the slower flow rate valve is open, and when the interface is below the distal ends of both probe members, both valves are closed.

BRIEF DESCRIPTION OF THE DRAWINGS

The invention is illustrated, merely by way of example, in the accompanying drawings, in which.

DESCRIPTION OF THE PREFERRED EMBODIMENT

Figures 1, 1A, 2:
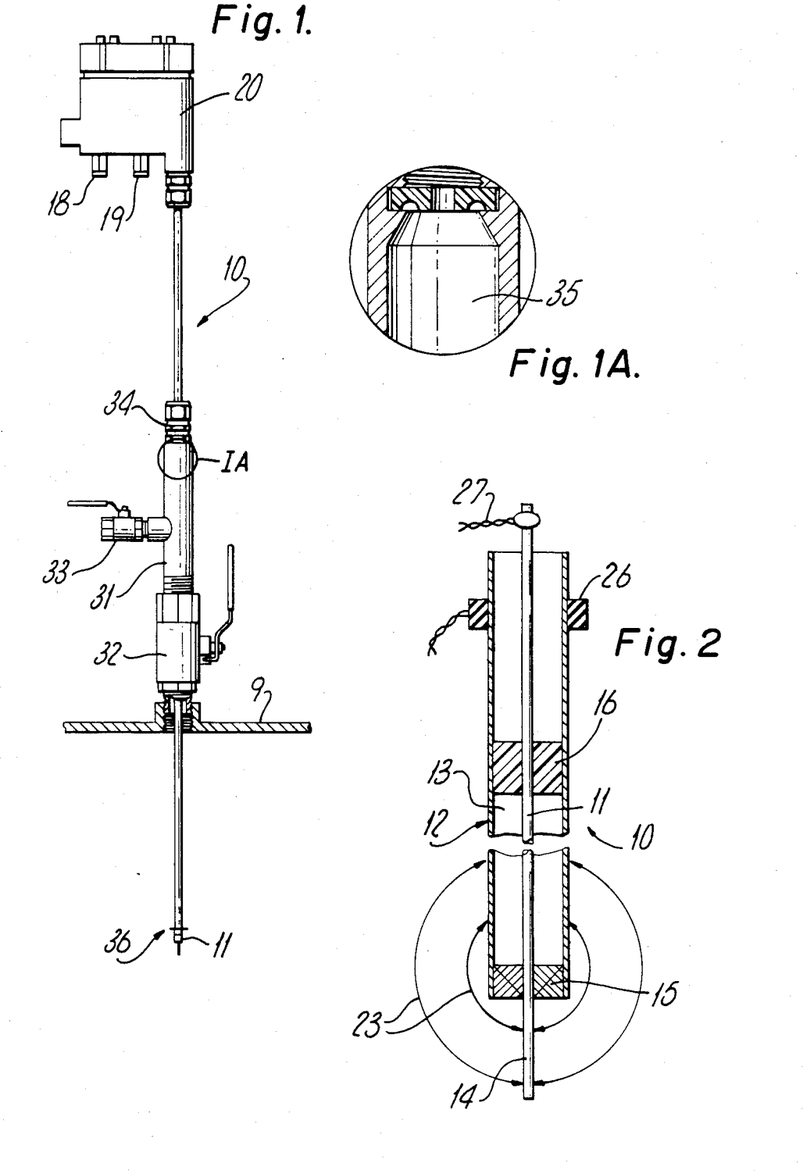
FIG. 1 shows a device according to the present invention for detecting an interface between two fluids of differing electrical properties, the device comprising a probe which is shown as inserted into a conduit for the fluids.
FIG. 1A is an enlarged detail of the portion of FIG. 1 identified as 1A.
FIG. 2 is a broken-away sectional view of a probe forming part of the device of FIG. 1.

In FIG. 1 there is shown a probe 10 which extends into a conduit 9, through which may flow, for example, a quantity of oil separated at an interface by a quantity of brine. As shown in FIG. 2, the probe 10 comprises an electrically conductive probe member 11 which is mounted within and is co-axial with an electrically conductive shield 12. The probe member 11 is spaced from the shield 12 by an annular air core 13. The probe member 11, adjacent its distal end portion 14, is sealed to the shield 12 by a dielectric seal 15. The latter prevents the ingress of the oil and brine, or other fluids within the conduit 9, into the space between the shield 12 and the probe member 11. The spacing between the probe member 11 and the shield 12 is maintained by at least one and preferably by a plurality of axially spaced apart insulating members 16 which are mounted within the shield 12 so that they are axially spaced from each other by distances equal to at least 10 times the outer diameter of the shield 13.

Figure 3:
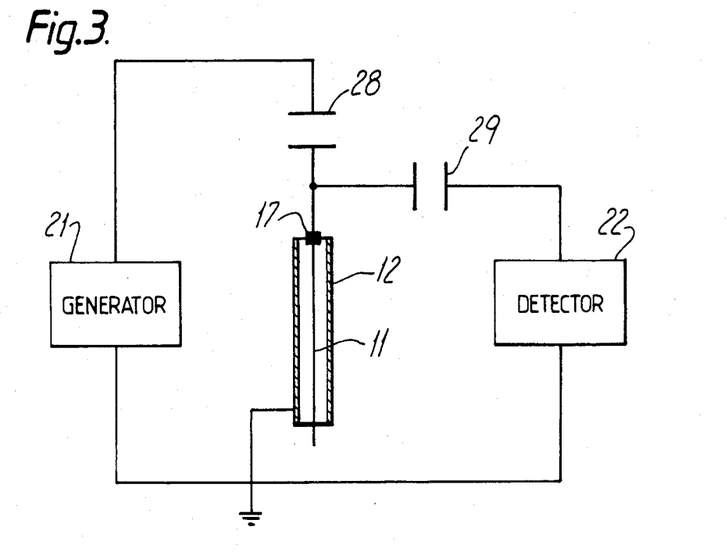
FIG. 3 is a diagram of an electrical circuit forming part of the device of FIG. 1.

The proximal end of the probe member 11 is insulated from the shield 12 by an insulator 17 (FIG. 3). The probe member 11 may be three feet long (91.44 cms) and may have a diameter which is not more than one quarter the inner diameter of the shield 12.

The probe 10 extends downwardly from a head 20 within which there are mounted a generator 21 and detector 22 (FIG. 3), the head 20 having a supply connection 18 and an output connection 19. The generator 21, which is mounted on a printed circuit board (not shown) and which may be constituted by a free-running multivibrator, is adapted to generate a long wave radiofrequency, e.g. in the frequency range 15–150 kHz. As will be seen in FIG. 3, the probe 10, generator 21, and detector 22 form an electrical circuit in which the probe member 11 and shield 12 are connectd across both the generator 21 and the detector 22. The probe member 11 is connected to the generator 21 through a capacitor 28 and is connected to the detector 22 through a capacitor 29, while the shield 12 is grounded. The arrangement is thus such that, in operation, the generator 21 transmits the long wave radio-frequency through the probe member 11 to the fluids, while the connection of the probe member 11 through the capacitor 29 to the detector 22 allows the latter to detect the radio-frequency of the fluids. The use of the long wave radio frequency further reduces the extent to which the detector 22 is responsive to capacitance.

In operation, the generator 21 produces a radiating field as indicated by the curved lines 23. The power taken by this radiating field will be affected by the general impedance (resistance and reactance) of the fluid or fluids into which the probe member 11 is inserted. The detector 22 will therefore detect any change in this impedance and can therefore be arranged to indicate the interface between the to fluids of differing electrical properties, e.g. the oil and brine mentioned above, since there will be a change in the impedance at this interface. As will be appreciated, and in contrast to the prior art, the detector 22 will thus be responsive not just to a single simple property like capacitance or conductivity, but, as stated above, to the general impedance of the fluids, the frequency generated by the generator 21 being chosen to assist the detector 22 to determine such impedance.

In the FIG. 2 construction, the distal end 14 of the probe member11 extends outwardly of the shield 12. This construction is suitable where the probe member 11 is required to be positioned close to a non-conductive surface. If, however, the probe member 11 is required to be close to a conductive surface, it is preferred to use the construction shown in FIG. 4 in which the shield 12 has an outwardly extending portion 24 which extends outwardly of the probe member 11 and of the seal 15. The outwardly extending portion 24 is provided with a plurality of apertures 25 which constitute ports through which fluid may enter the outwardly extending portion 24.

Figure 4:
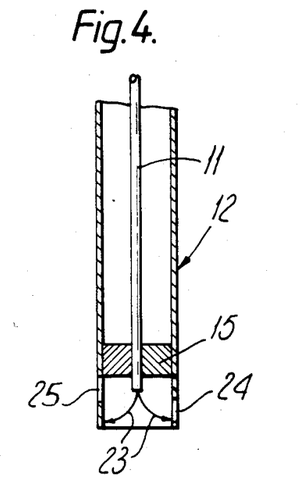
FIG. 4 is a broken-away sectional view illustrating a probe which may be used in substitution to that shown in FIG. 2.

Both in the case of the FIG. 2 construction and in the case of the FIG. 4 construction, the use of the shield 12 and air core 13 ensures that the probe 10 has low capacitance and this enables the probe to be made in long lengths which is very convenient in practice.

A toroidal piezo-electric transponder 26 is connected to the shield 12, while a longitudinal piezo-electric transponder 27 is connected to the probe member 11. The transponders 26, 27 thus enable ultra-sonic vibrations to be imparted to the shield 12 and probe member 11 for cleaning purposes, such ultra-sonic vibrations producing cavitation of the fluids. The transponders may be either piezo-electric or magnetostrictive. It should be noted that the ultra-sonic vibrations set up by the use of the transponders 26, 27 does not interfere with the electrical impedance of the fluid and therefore does not affect the reading provided by the detector 22.

Although the transponders 26, 27 are shown in FIG. 2 as being permanently connected to the shield 12 and probe member 11 respectively, the arrangement may be that they are connected thereto only when required.

Figure 5:
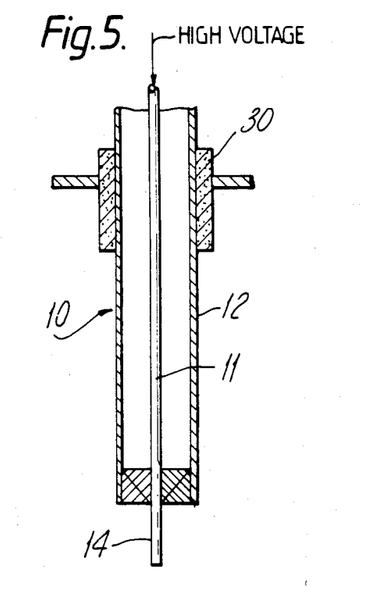
FIG. 5 illustrates the application of high voltage to the probe member of a probe as shown in FIG. 2, FIGS. 6(a), (b) and (c), illustrate a modified device according to the present invention for detecting an interface, the interface being shown in different positions in FIGS. 6(a), 6(b) and 6(c)

If it is required to burn off dirt on the probe member 11, the probe 10 may, as shown in FIG. 5, be mounted in an insulator 30, the shield 12 being allowed to float electrically from a container of fluid (not shown). A high voltage is then transmitted (from means not shown) to the probe member 11 so as to burn off dirt etc., on the distal end 14 of the probe member 11. In this case, means (not shown) may be provided for preventing operation of the detector during the transmission of the high voltage or, alternatively, the probe 10 may be readily disconnectable from the head 20 and may be disconnected therefrom prior to the high voltage being transmitted to the probe member 11.

As shown in FIG. 1, the probe 10 is mounted within a seal housing 31 which is threaded into a main valve 32 which is sealed to the conduit 9. The distal end of the probe member 11 extends into the conduit 9. The main valve 32, which is constituted by a ball valve, controls fluid flow therethrough from the conduit 9. The seal housing 31 has a bleed or sample valve 33, which communicates with the space within the seal housing 31 and which is disposed between the main valve 32 and a compression fitting 34 and a U-cup seal 35.

In order to insert the probe 10 into the conduit 9, the main valve 32 being closed, the probe 10 is first inserted into the seal housing 31 by way of the compression fitting 34 and U-cup seal 35. The probe 10 is thus at this stage sealed to the members 34, 35. The main valve 32 is then opened and the probe 10 is moved downwardly into the conduit 9 and, when it has reached the required position, the compression fitting 34 is tightened so that the vertical position of the probe member 10 is fixed, when it is required to withdraw the probe 10, the compression fitting 34 is released, and the probe 10 is retracted through the main valve 32 and into the seal housing 31 above the latter. The main valve 32 is then closed, and the bleed valve 33 is opened to de-pressurise the seal housing 31. A retention clip 36 is provided to prevent accidental total withdrawal of the probe 10 from the conduit 9. If, however, it is desired to remove the probe 10 completely, then the seal housing 31 is unscrewed from and thus disconnected from the main valve 32.

Figure 6A:
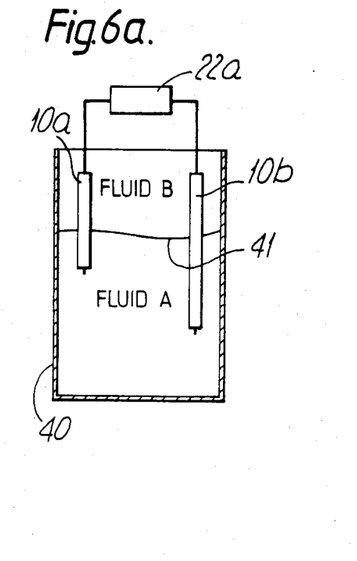
Figure 6B:
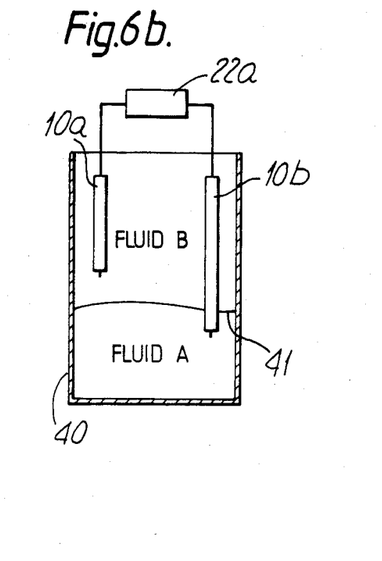
Figure 6C:
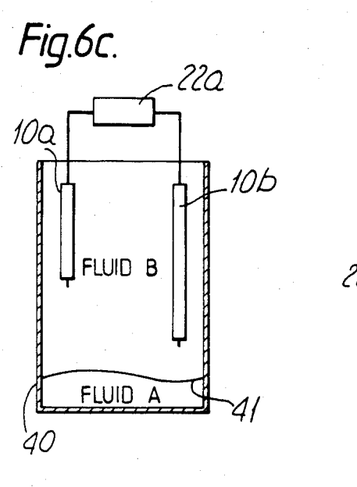

In the embodiment of the invention shown in FIG. 6, the device for detecting an interface between the two fluids of differing electrical properties, instead of employing a single probe 10, employs two probes 10a, 10b which are arranged to extend to different extents into a container 40. The container 40 is shown as containing two fluids, namely fluid A and fluid B, which are separated at an interface 41. The probes 10a, 10b, are connected to a common detector 22a which is arranged to respond to the difference between the electrical outputs of the probes 10a, 10b. The other features of the device of FIG. 6 are not shown since these are the same as those illustrated in FIGS. 1 to 3.

The device of FIG. 6 is designed to overcome the problem of drift in the detector 22 and also to overcome the problem arising from the fact that various fluids which form the interface to be detected have differing electrical properties.

Thus, as will be appreciated, when the distal ends of the probe members of the probes 10a, 10b are in contact with the same fluid, which may be either the fluid A when the interface 41 is in the position shown in FIG. 6(a), or the fluid B when the interface 41 is in the position shown in FIG. 6(c), the differential output of the probes 10a, 10b is zero and this differential output is not affected by the particular electrical properties of the fluids. When, however, the interface 41 is disposed between the said distal ends as shown in FIG. 6(b), then the differential output of the probes 10a, 10b is at its maximum. Thus if the electrical properties of either fluid A or fluid B changes, it affects both probes in a similar manner and such change in the electrical properties is therefore cancelled out in the case of the differential mode of operation illustrated in FIG. 6.

Figure 7:
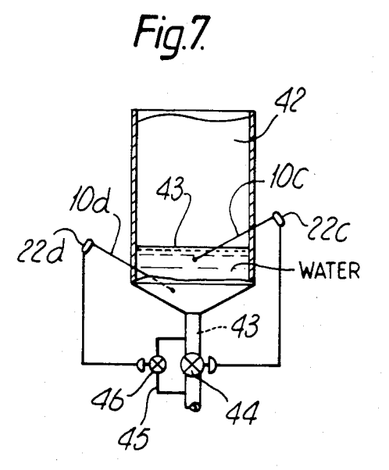
FIG. 7 is a diagrammatic view of a further embodiment of a device according to the present invention for detecting an interface between two fluids.

In FIG. 7 there is shown a device according to the present invention which comprises a container 42 constituted by a tank whose lower end communicates with a pipe 43 having a valve 44 therein. A by-pass 45 extends about the valve 44 and has a valve 46 therein. Thus when the valve 46 is open fluid may flow through the pipe 43 without passing through the valve 44.

An upper probe 10c and a lower probe 10d extend to different levels in the container 42. The probes 10c, 10d are respectively connected to and affect operation of detectors 22c, 22d which respectively control opening and closing of the valves 44, 46. The valve 44, which is thus associated with the upper probe 10c, has, when open, a substantially faster flow rate therethrough than the valve 46 associated with the lower probe 10d. Thus, for example, the valve 44 may be a 4" (10.16 cm) valve, while the valve 46 may be a 1" (2.54 cm) valve. The arrangement may thus be such that when the distal ends of both probe members 10c, 10d are below an interface 43 in the container, e.g. an interface between water and oil therein, both the valves 44, 46 are open so that water passes swiftly out of the container 42. When, as a result, the interface 43 falls to a position between the said distal ends, the faster flow rate valve 44 is closed and the slower flow rate valve 46 is allowed to remain open so that the rate at which the water flows out of the container 42 is very much reduced. Thus in the specific example mentioned above, the flow rate will be reduced to 1/16th of that previously employed so that vortices and entrainment of product with the water will not occur. Finally, when the interface 43 has fallen below the distal ends of both the probe members of the probes 10c, 10d, both the valve 44, 46 will be closed so that none of the fluid above the interface will be lost.

In FIG. 8 there is shown a skimmer for skimming a layer of oil from the surface of a body of water. The skimmer comprises a skimmer tube 50 having a side opening 51 provided with a weir 52. The skimmer tube 50 is adapted to be placed in a body of water 53 on which there is a layer of oil 54 which is separated from the body of water 53 at an interface 55. As will be clear from the description below, the skimmer tube 50 is operated so that the oil (but not the water) passes over the weir 52 and enters the skimmer tube 50 from which it is removed by means not shown. In order to achieve this it is necessary to ensure that the weir 52 is at all times below the surface 56 of the oil but above the interface 55.

A bracket 60 is secured to the skimmer tube 50 and carries a "HI" detector 61 and a "LO" detector 62. Probes 63, 64 extend respectively from the detectors 61, 62 and pass through the bracket 60 to which they are sealed by compression seals 65. The probe 64 extends to a position just below the weir 52 from which it is spaced by a distance x which may, for example, be $\frac{1}{4}"-\frac{1}{2}"$ (0.635 cms-1.27 cms). The probe 63 extends to a position below the probe 64 from which it is spaced by a distance y which may, for example, be 1"-2"(2.54 cms-5.08 cms).

Each of the detectors 61, 62 is arranged to give an on/off signal of 12 volts. A generator, which is not shown but which may correspond to the generator 21 of FIG. 3, transmits long-wave radio frequency impulses to the water and oil. The detectors 61, 62 and probes 63, 64 may correspond to those described above.

Figure 8A:
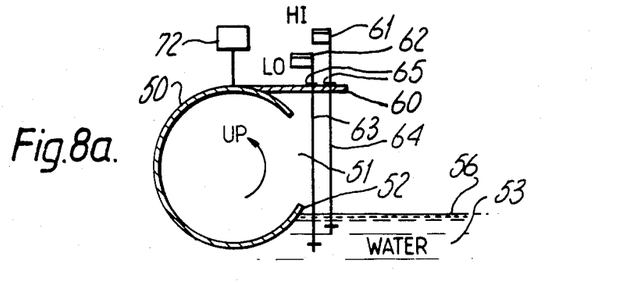
FIG. 8 shows at (a) (b) and (c) a skimmer according to the present invention whose weir is in different relative positions with respect to an oil/water interface.

When, as illustrated in FIG. 8(a), both the probes 63, 64 are in the water 53, the detectors 61, 62 produce ON signals which are transmitted via an AND gate 70 (FIG. 9) to operate a relay 71 such that a motor 72 raises the skimmer tube 50 so that the probe 64 is raised above the interface 56.

Figure 8B:
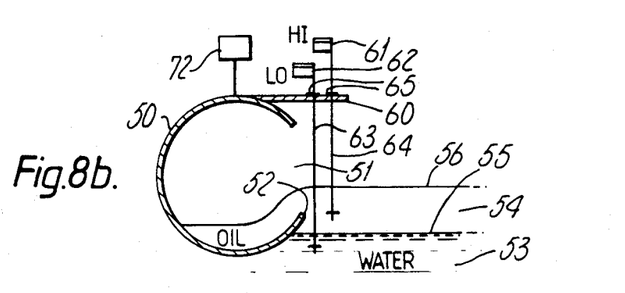

When, as illustrated in FIG. 8(b), the probe 63 remains in the water 53 but the probe 64 is in the oil 54, the detectors 61, 62 produce OFF and ON signals respectively which are transmitted to an AND gate 73, the signal from the "HI" detector 61 being inverted by an inverter 74. In these conditions, the motor 72 is stopped.

Figure 8C:
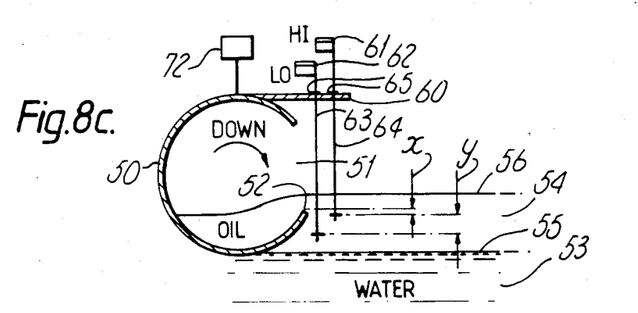

When, as illustrated in FIG. 8(c), both probes 63, 64 are in the oil 54, both detectors 61, 62 produce OFF signals which are transmitted via inverters 75, 76 to and AND gate 77. A relay 78 is therefore operated so that the motor 72 lowers the skimmer tube 50 so that the probe 63 is lowered into the water 53.

Thus the weir 52 will always be maintained in a position in which the oil can be skimmed from the water.

Figure 9:
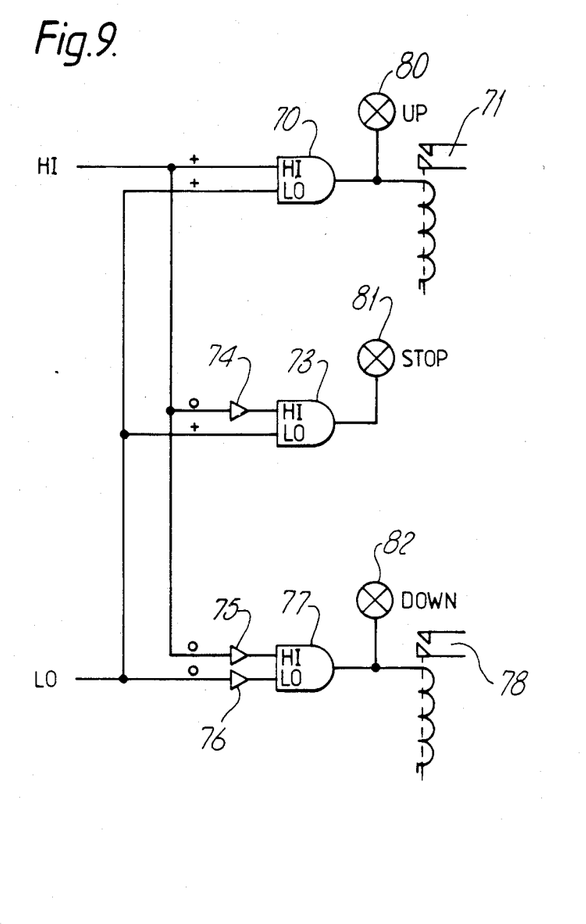
FIG. 9 is a circuit diagram of a device for maintaining the said weir in a substantially constant relative position with respect to the said interface.

Indicators 80, 81, 82 are provided to indicate the nature of the "Up", "Stop" and "Down" signals transmitted to the motor 72 so that if the skimmer tube 52 is stationary it is possible easily to check that this is not due to a power failure or mechanical failure.

Although reference has been made to raising and lowering the skimmer tube 52, it could alternatively be rotated so as to raise and lower the position of the weir 52.

We claim:

1. A device for detecting an interface between oil and water, which are two fluids of differing impedance, said device having an electrical circuit comprising transmitting means, a detector and at least one probe; said transmitting means being arranged to transmit electrical impulses to one of said two fluids by way of a probe so that the passage of these impulses through said fluid will be affected by the impedance of the latter; the detector being arranged to receive said impulses from the probe so as to detect a change in said impedance which occurs at said interface; and each said probe being adapted to extend into said fluid and comprising an electrically conductive probe member and a grounded electrically conductive shield, the probe member being mounted within the shield and being spaced from the latter by an air core, the probe member, adjacent its distal end portion being sealed to the shield by a dielectric seal which prevents the ingress of said fluid into the space between the shield and the probe member, the shield having an outwardly extending portion which extends outwardly of the probe member and of said seal.

2. A device as claimed in claim 1 comprising at least one insulator member mounted within the shield to maintain the spacing between the latter and the probe member.

3. A device as claimed in claim 2 in which there are a plurality of insulator members which are axially spaced from each other by distances equal to at least ten times the outer diameter of the shield.

4. A device as claimed in claim 1 in which the said outwardly extending portion is apertured to provide at least one port through which fluid may enter the said outwardly extending portion.

5. A device as claimed in claim 2 or claim 3 or claim 1 in which the diameter of the probe member is not more than one quarter of the inner diameter of the shield.

6. A device as claimed in claim 2 or claim 3 or claim 1 in which the length of the probe is at least 2 feet (60.96 cms).

7. A device as claimed in claim 2 or claim 3 or claim 1 in which the probe is mounted within a seal housing which is sealed to a conduit, the distal end of the probe member extending into said conduit, the seal housing having a main valve for controlling fluid flow therethrough, there being sealing means spaced from the main valve for sealing the seal housing to the probe, and a further valve which communicates with the space within the seal housing and which is disposed between the main valve and the sealing means.

8. A device as claimed in claim 2 or claim 3 or claim 1 in which the frequency of the said electrical impulses is in the range 15-150 kHz.

9. A device as claimed in claim 1 in which the detector is arranged to respond to the impedance of the fluids, the probe member being connected both to the transmitting means and to the detector by way of a capacitor.

10. A device for detecting an interface between two fluids of differing impedance, said device having an electrical circuit comprising transmitting means, a detector and at least one probe, said transmitting means being arranged to transmit electrical impulses to one of said two fluids by way of said probe so that the passage of these impulses through said fluid will be affected by the impedance of the latter; the detector being arranged to receive said impulses from said probe so as to detect a change in impedance which occur at said interface; and said probe being adapted to extend into said fluid, said probe comprising an electrically conductive probe member and a grounded electrically conductive shield, the probe member being mounted within the shield and being spaced from the latter by an air core, the probe member, adjacent its distal end portion, being sealed to the shield by a dielectric seal which prevents the ingress of said fluid into the space between the shield and the probe member, and means connected to the shield and to the probe member for imparting ultrasonic vibrations thereto for cleaning purposes.

11. A device for detecting an interface between two fluids of differing impedance, said device having an electrical circuit comprising transmitting means, a detector and at least one probe, said transmitting means being arranged to transmit electrical impulses to one of said two fluids by way of said probe so that the passage of these impulses through said fluid will be affected by the impedance of the latter; the detector being arranged to receive said impulses from said probe so as to detect a change in impedance which occurs at said interface; and said probe being adapted to extend into said fluid, said probe comprising an electrically conductive probe member and a grounded electrically conductive shield, the probe member being mounted within the shield and being spaced from the latter by an air core, the probe member, adjacent its distal end portion, being sealed to the shield by a dielectric seal which prevents the ingress of said fluid into the space between the shield and the probe member; means for transmitting a high voltage to the probe member to burn off dirt thereon; and means for preventing operation of the detector during the transmission of said high voltage.

12. A device for detecting an interface between two fluids of differing impedance, said device comprising a container for fluids, an electrical circuit comprising transmitting means, a detector and two probes, said transmitting means being arranged to transmit electrical impulses to one of said fluids so that the passage of these impulses through said fluid will be affected by the impedance of the latter; the detector being arranged to receive said impulses from said probes so as to detect a change in said impedance which occurs at said interface; the two probes extending into said container to different extents, the detector being arranged to respond to the difference between the electrical outputs of the probes, each said probe comprising an electrically conductive probe member and a grounded electrically conductive shield, the probe member being mounted within the shield and being spaced from the latter by an air core, the probe member, adjacent its distal end portion, being sealed to the shield by a dielectric seal which prevents the ingress of said fluid into the space between the shield and the probe member.

* * * * *

UNITED STATES PATENT AND TRADEMARK OFFICE
CERTIFICATE OF CORRECTION

PATENT NO. : 4,503,383
DATED : March 5, 1985
INVENTOR(S) : Joram Agar et al.

It is certified that error appears in the above-identified patent and that said Letters Patent is hereby corrected as shown below:

Column 1 Line 47 "and" should read --said--.

Column 2 Line 21 After "both" insert --to--.

Column 2 Line 46 "probes" should read --probe--.

Column 4 Line 8 "to" should read --two--.

Column 4 Line 19 "member11" should read --member 11--.

Column 6 Line 26 "valve" should read --valves--.

Column 7 Line 6 "and" should read --an--.

Claim 10 - Column 8 Line 21 "occur" should read --occurs--.

Signed and Sealed this

Second Day of July 1985

[SEAL]

Attest:

DONALD J. QUIGG

*Attesting Officer*      *Acting Commissioner of Patents and Trademarks*